US008690164B2

(12) United States Patent
Meng

(10) Patent No.: US 8,690,164 B2
(45) Date of Patent: Apr. 8, 2014

(54) TOOL BIT ASSEMBLY FOR QUICKLY ALTERNATING BITS

(76) Inventor: Ji-Fen Meng, Taichung (TW)

( * ) Notice: Subject to any disclaimer, the term of this patent is extended or adjusted under 35 U.S.C. 154(b) by 439 days.

(21) Appl. No.: 13/253,989

(22) Filed: Oct. 6, 2011

(65) Prior Publication Data

US 2013/0087981 A1 Apr. 11, 2013

(51) Int. Cl.
*B23B 31/107* (2006.01)

(52) U.S. Cl.
USPC ................. 279/75; 279/22; 279/30; 279/905; 279/155

(58) Field of Classification Search
CPC .............. B23B 31/107; B23B 31/1071; B23B 23/0035; B23B 23/0042; B23B 31/008; B23B 31/06
USPC ......... 279/22, 30, 74, 75, 76, 80, 82, 79, 904, 279/905, 906, 155
See application file for complete search history.

(56) References Cited

U.S. PATENT DOCUMENTS

| | | | | | |
|---|---|---|---|---|---|
| 832,560 | A * | 10/1906 | Furbish | ......................... | 152/109 |
| 1,138,465 | A * | 5/1915 | Fegley et al. | ................... | 279/82 |
| 3,726,533 | A * | 4/1973 | Lafferty, Sr. | .................... | 279/97 |
| 3,927,893 | A * | 12/1975 | Dillon et al. | .................... | 279/75 |
| 4,629,375 | A * | 12/1986 | Lieser | ....................... | 408/239 R |
| 5,934,384 | A * | 8/1999 | Wang | ............................ | 173/132 |
| 6,666,114 | B1 * | 12/2003 | Lin | ................................ | 81/438 |
| 6,840,143 | B1 * | 1/2005 | Lin | ................................ | 81/438 |
| 8,366,120 | B2 * | 2/2013 | Hu | ................................. | 279/82 |
| 8,366,121 | B2 * | 2/2013 | Hu | ................................. | 279/82 |
| 8,413,996 | B2 * | 4/2013 | Hu | ................................. | 279/82 |
| 8,550,471 | B2 * | 10/2013 | Huang | ............................ | 279/30 |
| 8,622,401 | B2 * | 1/2014 | Puzio et al. | ..................... | 279/30 |
| 2005/0116429 | A1 * | 6/2005 | Chang | ............................. | 279/75 |
| 2006/0145431 | A1 * | 7/2006 | Chang | ............................. | 279/74 |

* cited by examiner

*Primary Examiner* — Eric A Gates
*Assistant Examiner* — Paul M Janeski

(57) ABSTRACT

A hand tool with bit release device includes a connecting shaft, a block, a positioning bead and a cover. When the user wants to insert a tool bit into the connecting shaft, the user pushes the tool bit into the connecting shaft directly and the positioning bead engages with the tool bit firmly. When the user wants to release the tool bit from the connecting shaft, the user moves the cover axially relative to the connecting shaft and the positioning bead disengages with the tool bit so that the tool bit is released from the connecting shaft.

1 Claim, 4 Drawing Sheets

TOOL BIT ASSEMBLY FOR QUICKLY ALTERNATING BITS

BACKGROUND OF THE INVENTION

1. Field of the Invention

The present invention relates to a tool bit assembly and more particularly to a tool bit assembly for quickly alternating bits.

2. Description of Related Art

A conventional hand tool with connecting shaft includes a connecting shaft. The connecting shaft has a retaining hole opened at one end thereof. A positioning bead is extruded on the inner wall of the retaining hole of the connecting shaft. A screw bit has a notch corresponding to the positioning bead and defined on the outer periphery thereof Under this arrangement, when a user wants to assemble the screw bit to the connecting shaft, the user inserts one end of the screw bit into the retaining hole and the positioning bead is engaged with the notch of the screw bit at the retaining hole, so that the screw bit is assembled to the connecting shaft; when the user wants to remove the screw bit from the connecting shaft, the user holds the connecting shaft and pulls out the screw bit from the retaining hole. However, the conventional hand tool with connecting shaft has two shortcomings as following:

First, when the oil is attached to the user's hand, it is difficult to pull out the screw bit from connecting shaft for alternating the other screw bit.

Second, although the positioning bead is engaged with the notch of the screw bit, the positioning bead might not be engaged with the notch of the screw bit completely and firmly so that the screw bit at the retaining hole of the connecting shaft might not be stable to operate.

The present invention has arisen to mitigate and/or obviate the disadvantages of the conventional. Further benefits and advantages of the present invention will become apparent after a careful reading of the detailed description with appropriate reference to the accompanying drawings.

SUMMARY OF THE INVENTION

The main objective of the present invention is to provide an improved tool bit assembly.

To achieve the objective, a tool bit assembly for quickly alternating bits comprises a connecting shaft, a block, a positioning bead and a cover, a first groove defined on one side of the outer periphery of the connecting shaft, a second groove defined on another side of the outer periphery of the connecting shaft, a restricting member engaged with the second groove, a retaining hole axially opened at one end of the connecting shaft, a magnet and a first spring received in the retaining hole, the magnet located between the first spring and an opening of the retaining hole, a third groove opened on the bottom of the first groove, the third groove communicating with the retaining hole, the block mounted in the first groove and the shape of the block corresponding to the first groove, the block having a restricting part corresponding to the second groove, a fourth groove defined on one side of the block, the connecting shaft having a fifth groove corresponding to the fourth groove of the block, the fourth groove and the fifth groove formed a circle opening above the third groove and communicating with the third groove so that the positioning bead is moveably received in the space formed with the fourth groove, the third groove and the fifth groove, a cover encircling the connecting shaft, the cover having an incline surface at one end, the incline surface formed on the inside periphery of the cover and inclining toward an opening of the cover for compressing the positioning bead, a restricting ring mounted on the inside periphery of the cover, the connecting shaft encircled by a second spring, the second spring mounted between the connecting shaft and the cover, one end of the second spring abutting against the restricting member and the restricting part, another end of the second spring abutting against the restricting ring.

Under this arrangement, when a tool bit with a notch is inserted into the retaining hole by a user, the positioning bead is compressed toward the retaining hole by the incline surface of the cover and the positioning bead engages with the notch of the tool bit, thereafter the cover is positioned via the elasticity of the second spring so as to keep the positioning bead engaging with the notch of the tool bit, and the tool bit is inserted into the retaining hole of the connecting shaft firmly; when the user wants to release the tool bit from the retaining hole of the connecting shaft, the user moves the cover axially relative to the connecting shaft and the incline surface of the cover moves away from the positioning bead, thereafter the positioning bead moves up from the retaining hole so as to disengage with the notch of the tool bit and the magnet pushes the tool bit to release the tool bit from the connecting shaft via the recovering force of the first spring to push the magnet, furthermore after the positioning bead disengages with the notch of the tool bit, the magnet attracts the tool bit for preventing the tool bit from dropping down.

Further benefits and advantages of the present invention will become apparent after a careful reading of the detailed description with appropriate reference to the accompanying drawings.

DETAILED DESCRIPTION OF THE INVENTION

Figure 1:
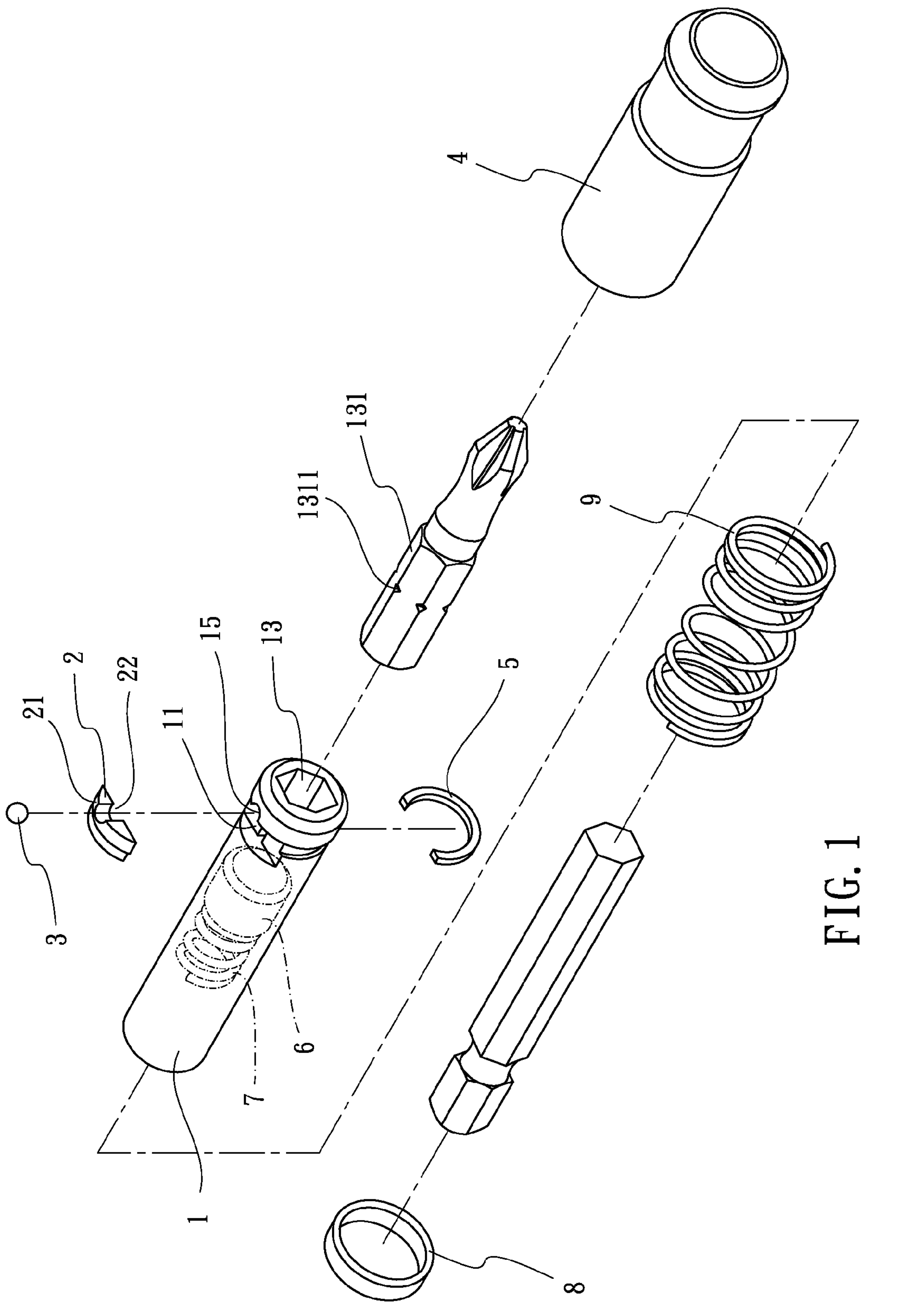
FIG. 1 is an exploded view of a tool bit assembly for quickly alternating bits of the present invention.
Figure 2:
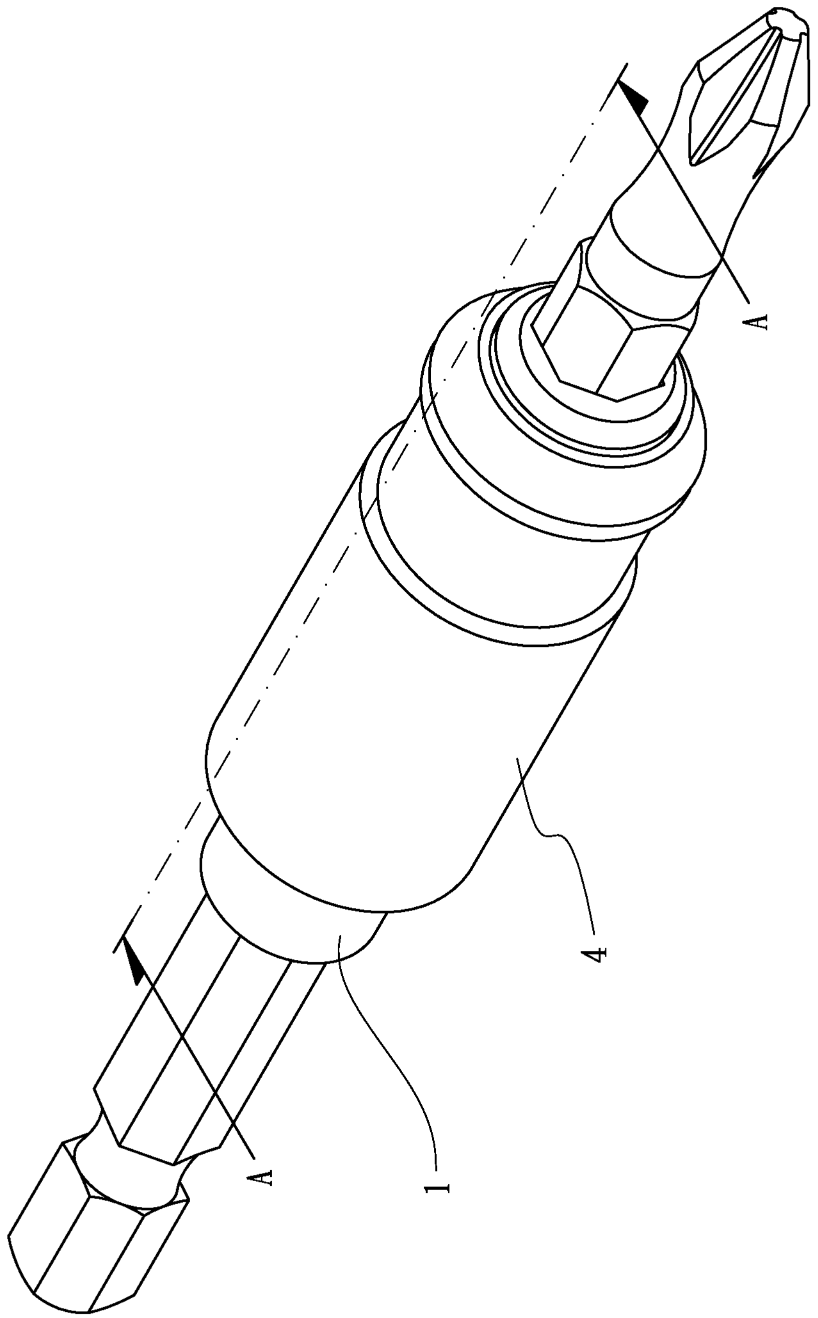
FIG. 2 is an assembled view of the tool bit assembly for quickly alternating bits of the present invention.
Figure 3:
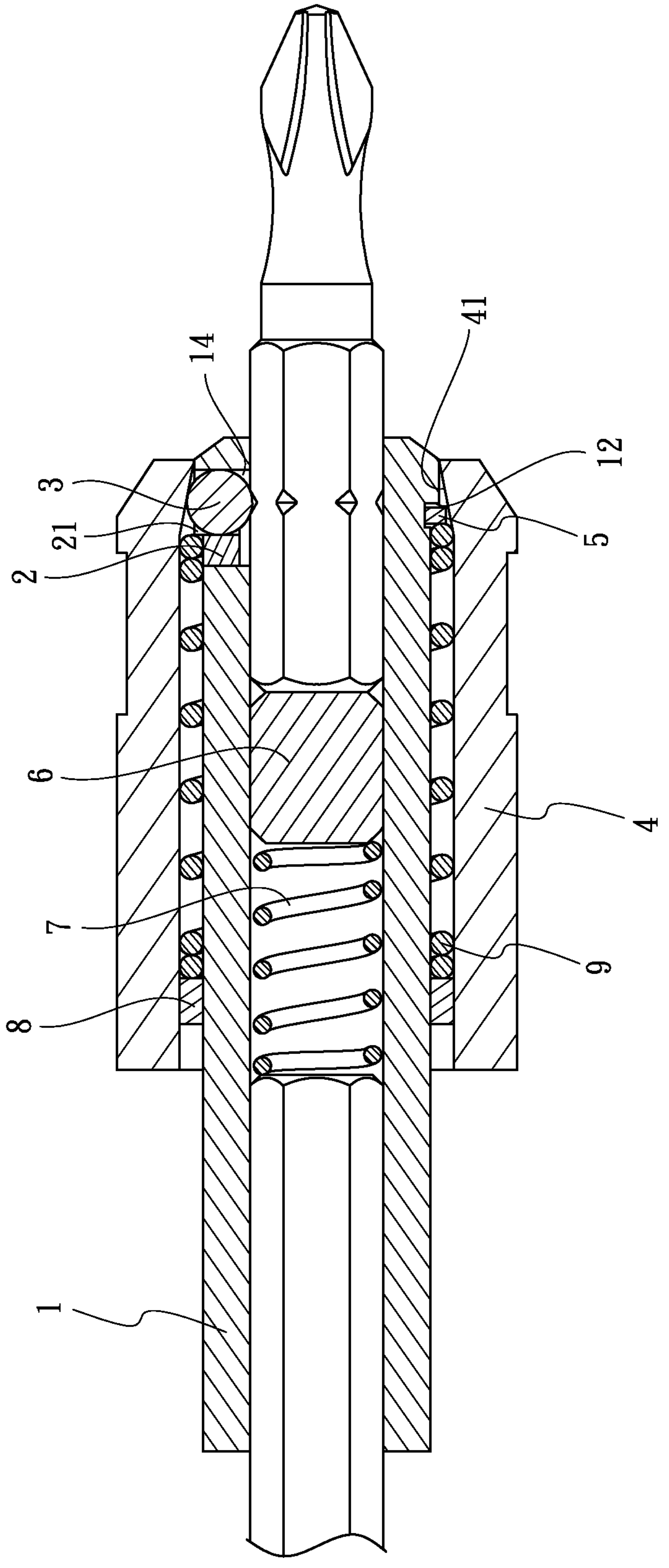
FIG. 3 is a cross-sectional view along line AA for showing a positioning bead engaging with a notch of a tool bit.
Figure 4:
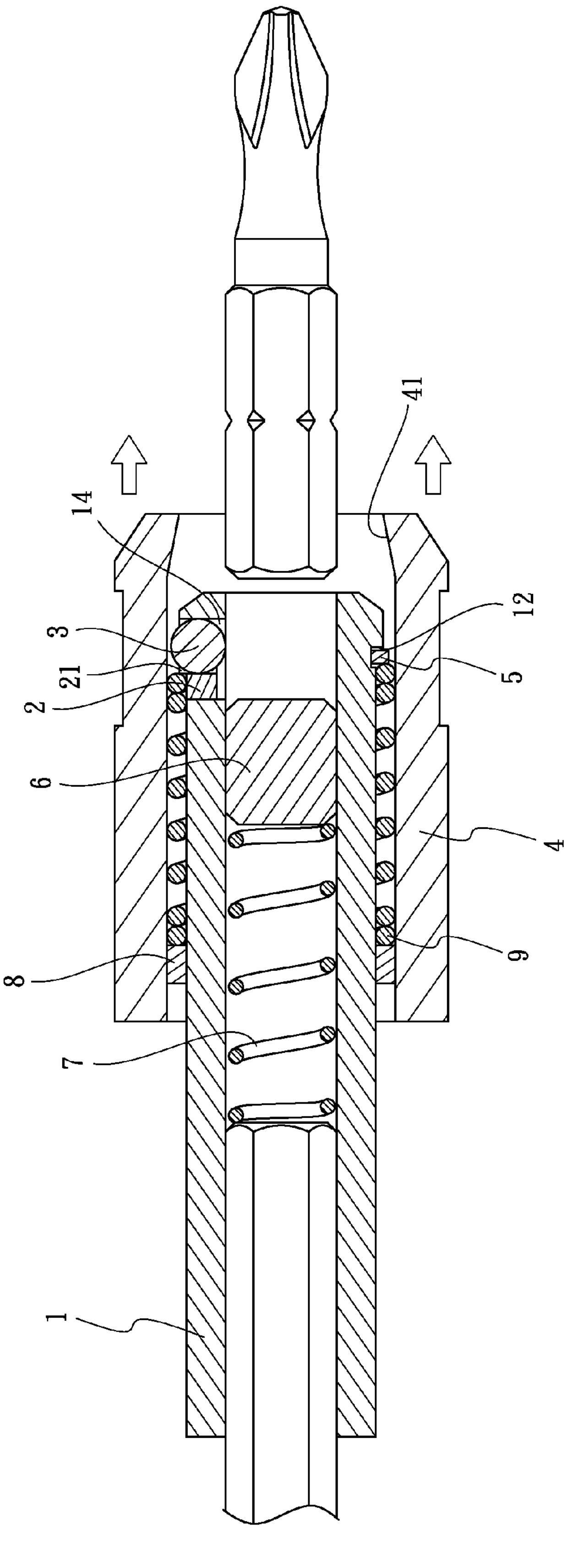
FIG. 4 is a cross-sectional view along line AA for showing a positioning bead disengaging with a notch of a tool bit.

Referring to FIGS. 1-3, a tool bit assembly for quickly alternating bits in accordance with the present invention comprises a connecting shaft 1, a block 2, a positioning bead 3 and a cover 4. A first groove 11 is defined on one side of the outer periphery of the connecting shaft 1. A second groove 12 is defined on another side of the outer periphery of the connecting shaft 1. An arc-shaped restricting member 5 is engaged with the second groove 12. A retaining hole 13 is axially opened at one end of the connecting shaft 1 (the cross-section of the retaining hole 13 is hexagon-shaped in the embodiment of the present invention). A magnet 6 and a first spring 7 are received in the retaining hole 13. The magnet 6 is located between the first spring 7 and an opening of the retaining hole 13. A third groove 14 is opened on the bottom of the first groove 11. The third groove 14 communicates with the retaining hole 13. The cross-section of the third groove 14 is circle-shaped and the diameter of the third groove 14 is shorter than the diameter of the positioning bead 3. The block 2 is mounted in the first groove 11 and the shape of the block 2 is corresponding to the first groove 11. The block 2 has a restricting part 21 corresponding to the second groove 12. A fourth groove 22 is defined on one side of the block 2 and the fourth groove 22 is semicircle-shaped. The connecting shaft 1 has a fifth groove 15 corresponding to the fourth groove 22 of the block 2. The fourth groove 22 and the fifth groove 15 are formed a circle opening above the third groove 14 and communicate with the third groove 14 so that the positioning bead 3 is moveably received in the space formed with the fourth groove 22, the third groove 14 and the fifth groove 15. A cover 4 encircles the connecting shaft 1. The cover 4 has an incline surface 41 at one end near the opening of the retaining hole 13. The incline surface 41 is formed on the inside periphery of the cover 4. The incline surface 41 inclines toward an opening of the cover 4 for compressing the positioning bead 3 so that the positioning bead 3 is positioned in the space formed with the fourth groove 22, the third groove 14 and the fifth groove 15 by the incline surface 41. A restricting ring 8 is mounted on the inside periphery of the cover 4. The connecting shaft 1 is encircled by a second spring 9. The second spring 9 is mounted between the connecting shaft 1 and the cover 4. One end of the second spring 9 abuts against the restricting member 5 and the restricting part 21. Another end of the second spring 9 abuts against the restricting ring 8. When a tool bit 131 having a notch 1311 is inserted into the retaining hole 13 by a user, the positioning bead 3 is compressed toward the retaining hole 13 by the incline surface 41 of the cover 4 and the positioning bead 3 engages with the notch 1311 of the tool bit 131, thereafter the cover 4 is positioned via the elasticity of the second spring 9 so as to keep the positioning bead 3 engaging with the notch 1311 of the tool bit 131, so that the tool bit 131 is inserted into the retaining hole 13 of the connecting shaft 1 firmly. When the user wants to release the tool bit from the retaining hole 13 of the tube 1, the user moves the cover 4 axially relative to the connecting shaft 1 and the incline surface 41 of the cover 4 moves away from the positioning bead 3, thereafter the positioning bead 3 moves up from the retaining hole 13 so as to disengage with the notch 1311 of the tool bit 131 so that the magnet 6 pushes the tool bit 131 to release the tool bit 131 from the connecting shaft 1 via the recovering force of the first spring 7 to push the magnet 6, furthermore after the positioning bead 3 disengages with the notch 1311 of the tool bit 131, the magnet 6 attracts the tool bit 131 for preventing the tool bit 131 from dropping down.

Although the invention has been explained in relation to its preferred embodiment, it is to be understood that many other possible modifications and variations can be made without departing from the spirit and scope of the invention as hereinafter claimed.

What is claimed is:

1. A tool bit assembly for quickly alternating bits comprising:

a connecting shaft, a block, a positioning bead and a cover, a first groove defined on one side of the outer periphery of the connecting shaft, a second groove defined on another side of the outer periphery of the connecting shaft, a restricting member engaged with the second groove, a retaining hole axially opened at one end of the connecting shaft, a magnet and a first spring received in the retaining hole, the magnet located between the first spring and an opening of the retaining hole, a third groove opened on the bottom of the first groove, the third groove communicating with the retaining hole, the block mounted in the first groove and the shape of the block corresponding to the first groove, the block having a restricting part corresponding to the second groove, a fourth groove defined on one side of the block, the connecting shaft having a fifth groove corresponding to the fourth groove of the block, the fourth groove and the fifth groove formed a circle opening above the third groove and communicating with the third groove so that the positioning bead is moveably received in the space formed with the fourth groove, the third groove and the fifth groove, a cover encircling the connecting shaft, the cover having an incline surface at one end, the incline surface formed on the inside periphery of the cover and inclining toward an opening of the cover for compressing the positioning bead, a restricting ring mounted on the inside periphery of the cover, the connecting shaft encircled by a second spring, the second spring mounted between the connecting shaft and the cover, one end of the second spring abutting against the restricting member and the restricting part, another end of the second spring abutting against the restricting ring;

under this arrangement, when a tool bit with a notch is inserted into the retaining hole by a user, the positioning bead is compressed toward the retaining hole by the incline surface of the cover and the positioning bead engages with the notch of the tool bit, thereafter the cover is positioned via the elasticity of the second spring so as to keep the positioning bead engaging with the notch of the tool bit, and the tool bit is inserted into the retaining hole of the connecting shaft firmly; when the user wants to release the tool bit from the retaining hole of the connecting shaft, the user moves the cover axially relative to the connecting shaft and the incline surface of the cover moves away from the positioning bead, thereafter the positioning bead moves up from the retaining hole so as to disengage with the notch of the tool bit and the magnet pushes the tool bit to release the tool bit from the connecting shaft via the recovering force of the first spring to push the magnet, furthermore after the positioning bead disengages with the notch of the tool bit, the magnet attracts the tool bit for preventing the tool bit from dropping down.

* * * * *